(12) United States Patent
Gonzalez Martin et al.

(10) Patent No.: US 12,197,187 B2
(45) Date of Patent: Jan. 14, 2025

(54) GEOMETRICAL TRANSFORMATIONS IN ADDITIVE MANUFACTURING

(71) Applicant: Hewlett-Packard Development Company, L.P., Spring, TX (US)

(72) Inventors: Sergio Gonzalez Martin, Sant Cugat del Valles (ES); Manuel Freire Garcia, Sant Cugat del Valles (ES); Leticia Rubio Castillo, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 477 days.

(21) Appl. No.: 17/417,784

(22) PCT Filed: Jun. 26, 2019

(86) PCT No.: PCT/US2019/039176
§ 371 (c)(1),
(2) Date: Jun. 24, 2021

(87) PCT Pub. No.: WO2020/263239
PCT Pub. Date: Dec. 30, 2020

(65) Prior Publication Data
US 2022/0113700 A1     Apr. 14, 2022

(51) Int. Cl.
*G05B 19/40* (2006.01)
*B22F 10/14* (2021.01)
(Continued)

(52) U.S. Cl.
CPC .......... *G05B 19/4099* (2013.01); *B22F 10/14* (2021.01); *B22F 10/80* (2021.01); *G05B 2219/49023* (2013.01); *G06F 30/23* (2020.01)

(58) Field of Classification Search
None
See application file for complete search history.

(56) References Cited

U.S. PATENT DOCUMENTS 5,442,733 A * 8/1995 Kaufman ................ G06T 15/06
345/419
5,828,575 A * 10/1998 Sakai ................ G05B 19/4097
700/182

(Continued)

FOREIGN PATENT DOCUMENTS

CN      108635682 A      10/2018
WO    WO-2015108546 A2    7/2015

OTHER PUBLICATIONS

Bacciaglia et al., "A systematic review of voxelization method in additive manufacturing", Jun. 1, 2019, Mechanics & Industry 20, 630 (2019) AFM, EDP Sciences 2019. (Year: 2019).*

(Continued)

*Primary Examiner* — Mohammad Ali
*Assistant Examiner* — Kelvin Booker
(74) *Attorney, Agent, or Firm* — Michael Dryja (57) ABSTRACT

In an example, a method includes receiving, at least one processor, voxelised object model data describing at least part of an intended fabrication chamber content to be generated using additive manufacturing. The voxelised object model data may be derived from a first data set modelling a first object as 2D slices and a second data set modelling a second object as a 3D mesh. Data within the voxelised object model data which is derived from the first data set may be identified, and a geometrical transformation may be applied thereto.

20 Claims, 4 Drawing Sheets

(51) Int. Cl.
*B22F 10/80* (2021.01)
*G05B 19/4099* (2006.01)
*G06F 30/23* (2020.01)

(56) References Cited

U.S. PATENT DOCUMENTS

| | | | | |
|---|---|---|---|---|
| 5,886,897 | A * | 3/1999 | Hazama | G05B 19/4097 |
| | | | | 700/182 |
| 6,867,770 | B2 * | 3/2005 | Payne | G06T 17/10 |
| | | | | 345/646 |
| 8,276,123 | B1 | 9/2012 | Deng et al. | |
| 2002/0038163 | A1 * | 3/2002 | Hazama | G06V 10/426 |
| | | | | 700/165 |
| 2003/0052875 | A1 * | 3/2003 | Salomie | G06T 17/20 |
| | | | | 345/419 |
| 2004/0247174 | A1 * | 12/2004 | Lyons | G06T 7/55 |
| | | | | 382/154 |
| 2005/0141757 | A1 * | 6/2005 | Ayache | G06T 7/30 |
| | | | | 382/128 |
| 2005/0151734 | A1 * | 7/2005 | Gubkin | G06T 15/08 |
| | | | | 345/424 |
| 2006/0012597 | A1 * | 1/2006 | Chakraborty | G06T 17/005 |
| | | | | 345/419 |
| 2006/0290695 | A1 * | 12/2006 | Salomie | G06T 17/20 |
| | | | | 345/423 |
| 2008/0094403 | A1 * | 4/2008 | Bakalash | G06F 9/5066 |
| | | | | 345/505 |
| 2010/0027861 | A1 * | 2/2010 | Shekhar | G06V 10/755 |
| | | | | 382/128 |
| 2011/0282473 | A1 * | 11/2011 | Pavlovskaia | G06T 7/13 |
| | | | | 700/98 |
| 2013/0187918 | A1 * | 7/2013 | Alj | G06T 15/08 |
| | | | | 345/420 |
| 2013/0300740 | A1 * | 11/2013 | Snyder | G06T 17/00 |
| | | | | 345/419 |
| 2014/0036455 | A1 | 2/2014 | Napadensky | |
| 2016/0320771 | A1 | 11/2016 | Huang | |
| 2017/0161876 | A1 * | 6/2017 | Carr | G06N 3/08 |
| 2017/0203515 | A1 | 7/2017 | Bennett et al. | |
| 2017/0232515 | A1 * | 8/2017 | DeMuth | B22F 12/90 |
| | | | | 419/53 |
| 2018/0086003 | A1 * | 3/2018 | Greene | B33Y 50/02 |
| 2018/0144219 | A1 * | 5/2018 | Kalisman | B33Y 50/00 |
| 2018/0146934 | A1 * | 5/2018 | Ripoche | A61B 6/032 |
| 2018/0243991 | A1 | 8/2018 | Troukens et al. | |
| 2018/0307209 | A1 | 10/2018 | Chin et al. | |
| 2019/0009472 | A1 | 1/2019 | Mark | |
| 2019/0099951 | A1 | 4/2019 | Zhang et al. | |
| 2019/0118480 | A1 | 4/2019 | Abello Rosello et al. | |

OTHER PUBLICATIONS

Tedia et al., "Manufacturability Analysis Tool for Additive Manufacturing Using Voxel-Based Geometric Modeling", 2016, Solid Freeform Fabrication 2016: Proceedings of the 27th Annual International Solid Freeform Fabrication Symposium—An Additive Manufacturing Conference Reviewed Paper (Year: 2016).*

Tang et al., "A hybrid geometric modeling method for lattice structures fabricated by additive manufacturing", Oct. 2018, The International Journal of Advanced Manufacturing Technology (2019) 102:4011-4030. (Year: 2018).*

* cited by examiner

GEOMETRICAL TRANSFORMATIONS IN ADDITIVE MANUFACTURING

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat in a thermal fusing additive manufacturing operation. This may comprise directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In one example such a fusing agent may comprise any or any combination of an infra-red light absorber, a near infra-red light absorber, a visible light absorber and a UV light absorber.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed to reduce or prevent coalescence by, for example, cooling the build material or through some other mechanism. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object. Examples of print agents comprising dye based colored ink and pigment based colored ink include inks commercially referred to as CE039A and CE042A available from HP Inc.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data may comprise, or can be processed to derive, slices or parallel planes of the model. Each slice may define a portion of a respective layer of build material that is to be solidified or caused to coalesce by the additive manufacturing system.

Figure 1:
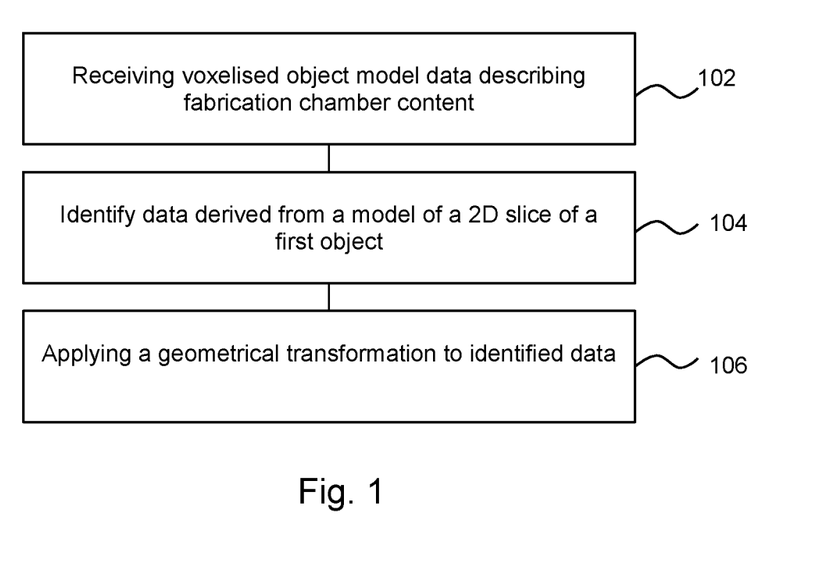
FIG. 1 is a flowchart of an example method of modifying object model data for additive manufacturing.

FIG. 1 is an example of a method, which may comprise a computer implemented method of determining a geometrical transformation to apply to object model data. The object model data (e.g. a CAD model) may be modified to compensate for anticipated deviations in dimensions when generating an object.

For example, it may be the case that, where an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object may be larger than the regions to which fusing agent is applied. In order to compensate for this effect, i.e. where it is anticipated that an object may tend to 'grow' during manufacture in this manner, the object volume as described in object model data may be reduced.

In other examples, objects may be smaller following object generation than is specified in object model data. For example, some build materials used to generate objects may shrink on cooling. Therefore, a geometrical transformation model may specify at least one geometrical compensation or transformation parameter to in turn specify how an object volume in object model data should be increased to compensate for the anticipated reduction in volume.

A particular object may be subject to mechanisms which result in growth and/or shrinkage, and the appropriate transformation to apply may be influenced by the different degrees to which an object may be affected by such processes. In some examples, it may be intended to tailor a transformation to a particular object and/or a particular object generation operation, as is described in greater detail below.

The method comprises, in block 102, receiving, by at least one processor, voxelised object model data describing at least part of an intended fabrication chamber content to be generated using additive manufacturing, the data being derived from a first data set modelling at least a first object as 2D slices and a second data set modelling at least a second object as a 3D mesh. As used herein, the designation of data as belonging to a first or second data set may be made at the point at which object model data is received by a processing system. In other words, data may be 'pre-sliced' remotely, and provided to the processing apparatus which performs the method in such a 'pre-sliced' form, and therefore be associated with the first data set. 3D mesh data may, as part of the processing pipeline be sliced by the processing apparatus which performs the method, but such data may be initially received as a 3D mesh. In some examples, the first data set may comprise data to which a transformation to compensate for object deformation in additive manufacturing has not been applied, and the second data set may comprise data to which a transformation to compensate for object deformation in additive manufacturing has been applied. In some examples, the first data set may comprise data to which a transformation tailored to particular object generation operation has not been applied, and the second data set may comprise data to which a transformation tailored to particular object generation operation has been applied.

The voxelised object model data represents the objects or portions objects as a plurality of sub-volumes referred to herein as 'voxels' (i.e. three-dimensional pixels), wherein each sub-volume represents a region of the object which is individually addressable in object generation. Voxels may provide a representation of the object which may be used to determine where to place print agents. For example, as is set out in greater detail below, an amount of print agent (or no print agent) may be associated with each of the voxels. In examples herein, print addressable areas of voxelised 2D slices are referred to as voxels as these implicitly have a thickness. The data may for example be received over a communications network, or from a local memory or the like.

Block 104 comprises identifying, by at least one processor (which may be the same or different processor(s) to those referred to in block 102) and within the voxelised object model data, data derived from the first data set (i.e. the data derived from two dimensional slice(s) of an object).

The voxelised object model data of the first data set may be obtained directly from one or more object 'slice'. An object may be represented as a stack of 2D slices, for example represented as polygons, or in some examples as slices rasterised in pixels of nominal depth corresponding to a layer of the object (i.e. voxels represented as 2D pixels). In block 104, such data—i.e. that data derived from data received as 2D slices—is identified. The voxelised object model data of the second set may be derived from a polygonal mesh (e.g. a STereoLithographic (STL) data file) characterising the form of an object. In some examples, the polygon meshes may have undergone a dimensional modification, for example to compensate for anticipated deformations in object generation. In some examples, if the second data set models a plurality of objects, the geometrical transformation applied may vary between the objects. In some examples, the data of the first set may not have undergone such transformation to compensate for object deformation.

In some examples, identifying the data derived (directly) from a model of a two-dimensional slice may comprise reviewing a tag associated with the data. For example, the data may be associated with an identifier indicating that it is data derived from a model of a two-dimensional slice (e.g. a 'pre-sliced' model). For example, data of the second data set may be tagged as "TESSELATED" using a metadata attribute or the like, and data of the first data set may be tagged as "SLICED" if received as a slice mesh "SLICED_VOXELIZATION" if received as a sliced and voxelised model.

In this example, block 106 comprises applying, by at least one processor (which may be the same or different processor(s) to those referred to in block 102 and/or block 104), a geometrical transformation to at least part of the first data set as identified in block 104. In some examples, no such compensation is applied to voxelised object model data derived from 3D meshes, i.e. the data of the second data set. In some examples, if the first data set models a plurality of objects, the geometrical transformation to apply may vary between the objects.

The method of FIG. 1 therefore allows voxelised data from a model of a two-dimensional slice to be treated differently from data derived from another model type, in particular a 3D mesh. In one example, the data may be divided based on whether access is provided to the 3D mesh model prior to voxelisation. If the 3D mesh model is available for a geometrical transformation (which may be a transformation determined based on at least one intended object generation parameter for that object, such as an object generation location, apparatus, material or the like, and/or an object characteristic such as object volume and/or surface area, as discussed in greater detail below), then the data may belong to the second data set. If the 3D mesh is not available because the data is received 'pre-sliced', then the data may belong to the first data set.

Different object model types may be appropriate in certain circumstances. For example, 3D meshes are highly adaptable. Geometrical transformations such as offsets and scaling factors may be readily applied to such data. A scaling factor may be used to multiply all specified dimensions in the direction of at least one axis by a value, which may be greater than 1 in order to increase the dimension(s) and less than 1 to reduce the dimension(s). An offset may specify, for example by a specified distance or a number of defined voxels, an amount to add or remove from a surface of the object (or a perimeter within a layer). For example, a distance as measured in the direction of a normal from the object surface may be specified and the object may be eroded or dilated (i.e., inflated or enlarged) by this distance.

When considering mesh models, different compensation may be applied to different mesh models. For example, a geometrical compensation model may be used to determine an offset and/or scaling parameter. This may be based on different object generation parameters and/or different object characteristics, as discussed in greater detail below.

One example of a geometrical compensation model may comprise one or a set of scaling and/or offset parameters associated with a particular object generation apparatus, or type of object generation apparatus. Geometrical compensation models may specify at least one scaling factor and/or at least one offset value, and in some examples associate a scaling factor and/or offset value with at least one of three orthogonal (e.g. x, y and z) axes. In some example, the parameters may be applied to all objects in the same way (for example, regardless of the object size and/or placement). However, in other examples, a geometrical compensation model may allow a geometrical transformation derived or selected therefrom to be tailored to an intended object generation operation and/or object characteristic.

For example, a geometrical compensation model may take account of an intended location of an object in a fabrication chamber. It has been noted that dimensional deformation is related to the location of object generation, and therefore different compensation/transformation parameters may be applied for different object locations to improve accuracy. Such geometrical compensation models may therefore comprise or provide compensation parameters which may be mapped to the intended location of an object (which may for example be a single identifiable point such as the location of the centre of mass of the object, or may include a consideration of the volumetric extent of the object). For example, if an object is to be generated at a first location within the fabrication chamber, the location may be mapped to a geometrical transformation comprising one or more offset and/or scaling parameter. However, if the same object were to be generated at a second location within the fabrication chamber, this second location may be mapped to a different geometrical transformation comprising one or more different offset and/or scaling parameter. Thus, the particular geometrical transformation applied may vary between different locations based on predetermined mappings or the like.

In some such examples, at least one geometrical compensation model may comprise a plurality of defined geometrical transformation parameters (or parameter sets), each associated with different locations within the fabrication chamber. In such examples, a particular geometrical transformation parameter(s) may be selected based on the intended object generation location. In some examples, defined locations may be associated with geometrical transformation parameter(s), and the geometrical transformation parameter(s) to apply at locations intermediate to such defined locations may be generated for example by interpolation, or by selection of the closest defined location, or the like.

In other examples, characteristics of the object, such as consideration of the object volume and/or surface area, may be used as input parameters in a geometrical compensation model, as these may also be associated with characteristic deformation behaviour.

For example, bulkier objects (i.e. objects having a larger volume) may accrue greater thermal energy than smaller objects, and may therefore tend to accumulate more heat than smaller objects. Cooling such objects may therefore take more time than cooling less bulky objects. This may lead to different deformations. Thus, in one example a first compensation model may comprise a compensation factor associated with object volume while in other examples there may be no such compensation factor, or a different compensation factor may be used.

The surface area (and combinations of the volume and surface area) may be used to determine how 'solid' an object is. The amount of solid material in an object may be used to predict how the object may deform. For example, a more solid object may tend to accumulate more heat than a less solid object in a thermal fusing additive manufacturing operation. Such object generation parameters may therefore be mapped to different geometrical compensation parameters within a geometrical compensation model.

Such models may be derived experimentally, or determined using theory, or the like.

Therefore, when considering mesh object models, the geometrical transformation that may be applied can be tailored to particular circumstances.

However, when an object data model comprises 'pre-sliced' data, such modifications are more complex. When the object model is 'sliced', this is carried out by considering the anticipated layer height during object generation, with one slice corresponding to each layer. This therefore assumes that a z-height for the object as a whole is determined and therefore any modifications applied after slicing are non-trivial. In practice, it has been proposed to scale objects prior to slicing, which maintains their proportions. However, where the object is supplied 'pre-sliced', factors such as the intended location of the object within a fabrication chamber and in some examples the build material(s) and/or parameter(s) may not be known. Therefore, the compensation that may be applied in practice is reduced compared to that available for mesh data.

However, such 'pre-sliced' object model data may be useful for complex structures. For example, considering an object with a lattice of beams (for example providing an internal micro-structure for an object to reduce the average density thereof while maintaining strength), the number of polygons—and hence the data file size—to represent the complex surfaces of such an object in 3D may be exceedingly large. Another example may be a texture applied to a 3D surface (for example using a displacement map having a format as specified by the 3MF Consortium). For example, many more polygons would be formed to model a golf ball with dimples than one without.

If however such a 'pre-sliced' object is generated without any transformation (which may be a transformation based on at least one of an object generation parameter or an object characteristic), then departures from intended dimensions may be seen.

Therefore, the method of FIG. 1 allows for such 'pre-sliced' models to be treated differently from 3D mesh models. While 3D mesh models may have geometrical transformations applied prior to voxelisation, at least one geometrical transformation may be applied to pre-sliced models after voxelisation. At least one of the transformations may be a transformation based on at least one of an object generation parameter and an object characteristic.

Figure 2:
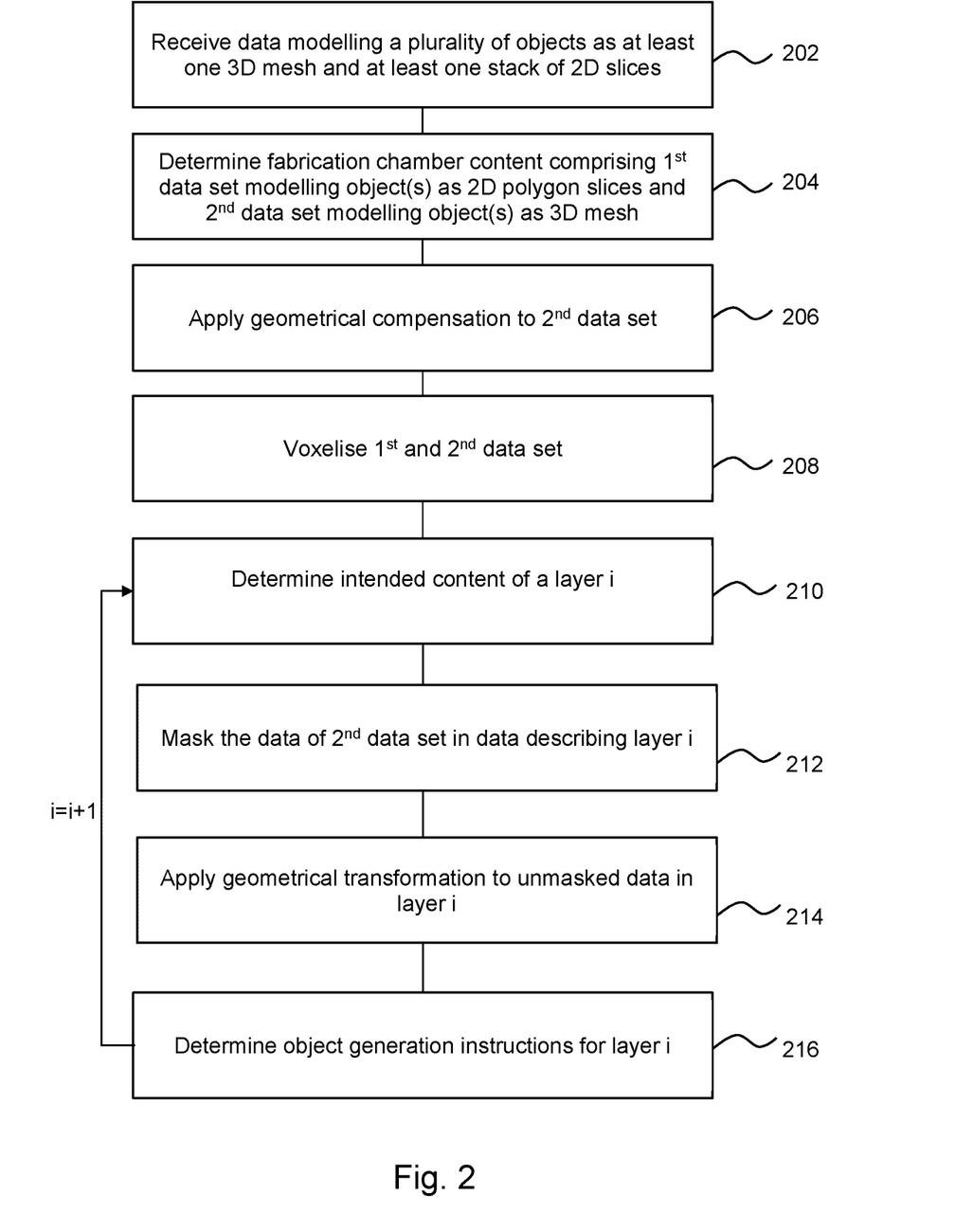
FIG. 2 is a flowchart of an example method of determining object generation instructions.

FIG. 2 shows an example of a computer implemented method of determining additive manufacturing instructions. In some examples, at least part of the method may be carried out by processing circuitry of an additive manufacturing apparatus. In some examples, at least part of the method may be carried out concurrently with an object generation operation. In particular, one slice of object model data may be processed to determine object generation instructions for generating a corresponding layer in an additive manufacturing operation while a previous layer is being generated. This reduces the need to store processed object generation instructions (which can be large, and thus consume significant memory resources). In addition, the time-consuming processing stage may be combined with the object generation processing time, which is efficient. However, in some additive manufacturing operations, a consistent layer processing time is indicated as this results in a more consistent outcome (for example, less warping than may be seen if some layers may be allowed to cool for longer than others). Therefore, the processing of the data may be such that the time to process the data of a slice is at least not substantially longer than the time to generate a layer.

Block 202 comprises receiving data modelling a plurality of objects to be generated in a single additive manufacturing operation. A first group of one or more objects comprises objects which are each modelled as a stack of 2D polygon slices. A second group of one or more objects comprises objects which are each modelled as a 3D polygon mesh.

Block 204 comprises determining a first representation of an intended content fabrication chamber to be generated in a common additive manufacturing operation, the data comprising a first data set modelling objects as 2D polygon slices and a second data set modelling objects as 3D meshes. In this example, two 'virtual' fabrication chambers are generated, a first virtual fabrication chamber indicative of the 2D slice object(s), each associated with an intended position of manufacture, and a second virtual fabrication chamber indicative of the 3D mesh object(s), each associated with an intended position of manufacture. The location of the objects may be determined using a packing algorithm, and/or by generating a plurality of possible arrangements and scoring the arrangements against criteria such as the overall height, the number of objects, or the like. In other examples, the placement of objects may be user specified.

Block 206 comprises applying a geometrical transformation to the 3D meshes of the second data set. The transformation to be applied may be determined based on at least one of an object generation parameter or an object characteristic. In some examples, as set out above, the geometrical transformation may be based on their location within the second virtual fabrication chamber. In some examples, other factors such as the object volume and/or volume to surface area and the like may be considered.

Block 208 comprises voxelising the data of the first data set and the (modified) second data set. This may comprise process based on rasterization, and may comprise slicing the 3D meshes into 2D slices. In some examples, at least some data of the first data set may be 'pre-voxelised' and therefore voxelisation may not be carried out in relation to such data. This may generate a second representation of the intended fabrication chamber content.

Block 210 comprises determining an intended content of a layer i in additive manufacturing by determining the content of the first data set and the content of the second data set associated with a predetermined height within the fabrication chamber. For example, the method may start with the lowermost layer of the fabrication chamber, and may comprise merging the first and second virtual fabrication chambers. This may provide the voxelised object model data described in block 102 of FIG. 1.

Block 212 comprises, for the slice of data corresponding to layer i, masking the data derived from the second data set. This provides an example of identifying the data derived from a model of a two dimensional slice of a first object as described in relation to block 104 of FIG. 1. For example, the data may be masked based on a data tag or identifier associated therewith. In some examples, the data is associated with an object identifier, and the object may be associated with a category—i.e. 'pre-sliced' or '3D mesh', or as one of "TESSELATED", "SLICED" or "SLICED_VOXELIZATION" as described above. In other examples, the data of the first virtual fabrication chamber may be identified.

Block 214 comprises applying a geometrical transformation to any unmasked data. This may comprise determining if a geometrical transformation is applicable to one or more objects in the layer. In this example, the geometrical transformation to be applied comprises an offset applied to surfaces defined by the voxelised slice data. This may for example comprise applying (as applicable) x and y offsets to a perimeter of an object portion within a slice, where the xy plane is the plane of a layer in additive manufacturing, and the plane of a slice. For offsets in the height direction (the z direction) compensations may be applied symmetrically to the closest surface voxel at the higher and lower surfaces. Thus, if a total reduction in height of four voxels is specified, this may be applied to the upper and lower surface, removing two voxels in each case (and therefore impacting on a total of four slices/layers).

Block 216 comprises determining object generation instructions for layer i from the object model data comprising any compensations. The object generation instructions in some examples may specify an amount of print agent to be applied to each of a plurality of locations on a layer of build material. An amount of print agent (or no print agent) may be associated with each of the voxels. For example, if a voxel relates to a region of a build volume which is intended to solidify, the object generation instructions may be determined to specify that fusing agent should be applied to a corresponding region of build material in object generation. If however a voxel relates to a region of the build volume which is intended to remain unsolidified, then object generation instructions may be determined to specify that no agent, or a coalescence modifying agent such as a detailing agent, may be applied thereto, for example to cool the build material. In addition, the amounts of such agents may be specified in the generated instructions and these amounts may be determined based on, for example, thermal considerations and the like. In other examples, object generation instructions may specify how to direct directed energy, or how to place a binding agent or the like.

The method then repeats by identifying data relating to layer i+1, until all slices are processed.

In some examples, the method may further comprise generating at least one layer using the object generation instructions. Generating an object may comprise generating the object based on object generation instructions (or 'print instructions'). For example, such an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dots per inch (dpi), or 1200 dpi. A further layer of build material may then be formed and the process repeated, for example with the object generation instructions for the next slice. In other examples, objects may be generated using directed energy, or through use of chemical binding or curing, or in some other way.

By using a suitable compensation model—i.e. a compensation model which is tailored to a particular apparatus—to modify object model data, an object once formed may end up being closer to an intended size.

In some examples, blocks 208 to 216 may be carried out while a previous layer of the manufacturing operation is being carried out. In some examples, the blocks of the method of FIG. 2, or at least blocks 204 to 216, may be carried out by processing circuitry provided on an additive manufacturing apparatus.

Figure 3:
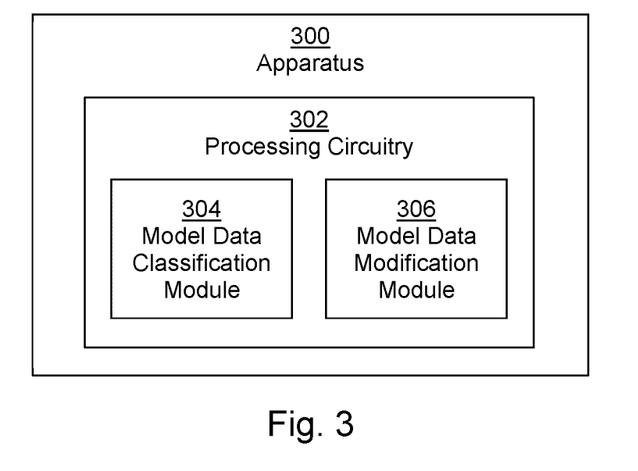
FIGS. 3 and 4 are simplified schematic drawings of example apparatus for additive manufacturing.

FIG. 3 shows an example of an apparatus 300 comprising processing circuitry 302, the processing circuitry 302 comprising a model data classification module 304 and a model data modification module 306.

In use of the apparatus 300, the model data classification module 304 identifies data in object model data modelling an intended fabrication chamber content to be generated using additive manufacturing. The object model data is derived from a first data set modelling a first object as 2D slices and a second data set modelling objects a second object as a 3D mesh, and the model data classification module 304 identifies data within the object model data which is derived from the first data set. For example, this may be identified based on a tag or an identifier and/or through use of 'masking' data generated from a 3D mesh, as has been described above.

In use of the apparatus 300, the model data modification module 306 may modify data derived from 2D slices—i.e. data of the first data set—to compensate for anticipated departures from intended dimensions in additive manufacturing. For example, this may comprise applying an offset thereto. In some examples, the model data modification module 306 may modify data representing an object as a 3D mesh (for example prior to voxelisation thereof), for example by applying scaling and/or offsets (which may in some cases be dependent on factors such as location). In some examples, it may be assumed that 2D data has been pre-scaled prior to slicing. The modification applied may depend on at least one object generation parameter (e.g. object generation apparatus, object generation material), and in some examples may differ between objects, for example based on at least one of an object generation parameter (e.g. object generation location) or an object characteristic (e.g. object volume and/or object surface area).

Figure 4:
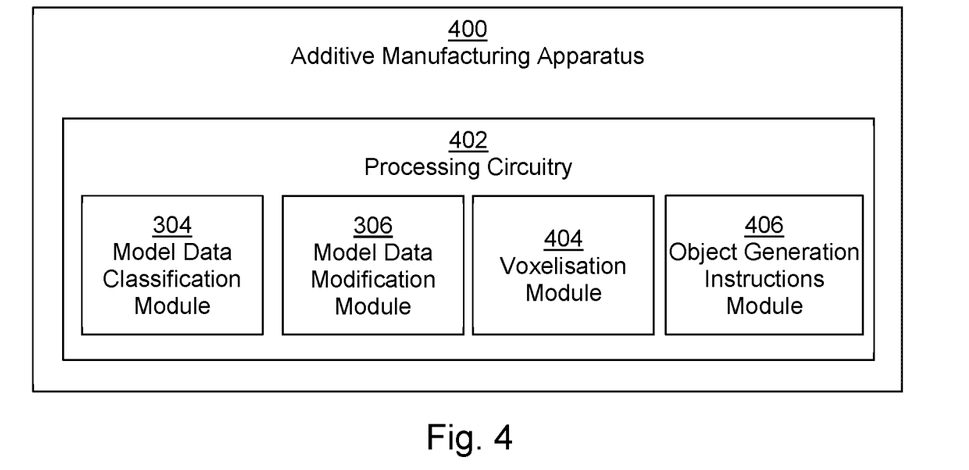

FIG. 4 shows an example of an additive manufacturing apparatus 400 comprising processing circuitry 402, wherein the processing circuitry 402 comprises the model data classification module 304 and the model data modification module 306 described in relation to FIG. 3. In addition, the additive manufacturing apparatus 400 further comprises a voxelisation module 404 and an object generation instructions module 406.

In use of the additive manufacturing apparatus 400, the voxelisation module 404 represents the object model data as a plurality of predetermined discrete volumes, for example using rasterization techniques. In this example, the model data modification module 306 modifies virtual objects represented as 3D meshes prior to voxelisation (for example using scaling and/or offsets), and not after voxelisation, and modifies virtual objects represented as 2D slices following voxelisation (for example using offsets and not using scaling) and not before voxelisation. In some examples, the 2D slices may be voxelised when received, and therefore may not be voxelised by the voxelisation module 404. The modification applied may be specific to an object generation parameter (e.g. object generation apparatus, object generation material) and in some examples differ between objects, for example based on at least one of an object generation parameter (e.g. object generation location) or an object characteristic (e.g. object volume and/or object surface area).

In use of the additive manufacturing apparatus 400, at least one object may be generated using the object generation instructions.

As discussed in greater detail above, the object generation instructions may in some examples specify an amount of print agent to be applied to each of a plurality of locations on a layer of build material.

For example, the additive manufacturing apparatus 400, in use thereof, may generate the object in a plurality of layers (which may correspond to respective slices of an object model) according to object generation instructions. The additive manufacturing apparatus 400 may for example generate an object in a layer-wise manner by selectively solidifying portions of layers of build material. The selective solidification may in some examples be achieved by selectively applying print agents, for example through use of 'inkjet' liquid distribution technologies, and applying energy, for example heat, to the layer. In other examples, heat may be selectively applied, and/or chemical agents such as curing or binding agents may be applied. The additive manufacturing apparatus 400 may comprise additional components not shown herein, for example any or any combination of a fabrication chamber, a print bed, printhead(s) for distributing print agents, a build material distribution system for providing layers of build material, energy sources such as heat lamps and the like.

The processing circuitry 302, 402 or the modules thereof may carry out any of the blocks of FIG. 1 or FIG. 2.

Figure 5:
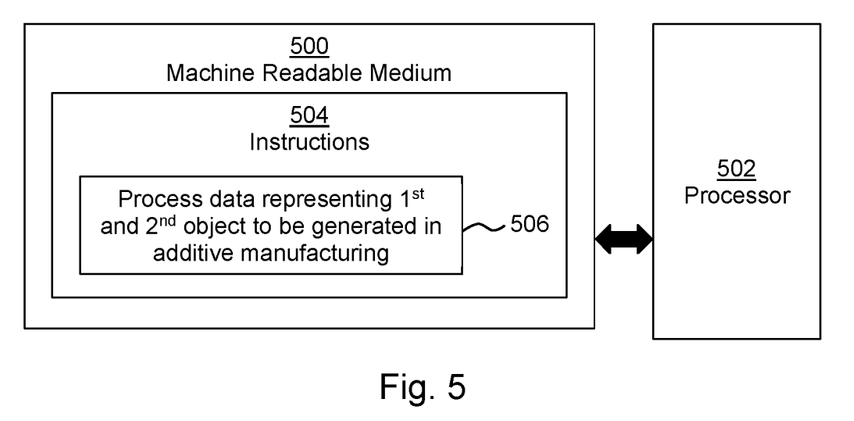
FIG. 5 is a simplified schematic drawing of an example machine-readable medium associated with a processor.

FIG. 5 shows a tangible machine-readable medium 500 associated with a processor 502. The machine-readable medium 500 comprises instructions 504 which, when executed by the processor 502, cause the processor 502 to carry out tasks. In this example, the instructions 504 comprise instructions 506 to cause the processor 502 to process data representing a first object and second object to be generated in additive manufacturing, wherein the first object is represented as a stack of 2D slices and the second object is represented as a 3D mesh. Processing the data comprises for data representing the first object, determining a voxel representation of at least one slice thereof, and applying a geometrical modification to the voxel representation of the slice; and for data representing the second object, applying a geometrical modification to the 3D mesh and determining a voxel representation of the modified 3D mesh. The geometrical modification may be to compensate for deformation in additive manufacturing. The modification applied may be determined based on at least one of an object generation parameter (e.g. intended object generation apparatus, intended object generation material, intended object generation location) or an object characteristic (e.g. object volume and/or object surface area).

In some examples, the data derived from the 3D mesh is not modified after voxelisation.

In some examples, the instructions when executed cause the processor 502 to carry out any of the blocks of FIG. 1 or FIG. 2. In some examples, the instructions may cause the processor 502 to act as any part of the processing circuitry 302, 402 of FIG. 3 or FIG. 4.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the model data classification module 304, model data modification module 306, voxelisation module 404 and/or object generation instructions module 406) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims. Based on means based at least in part on.

The features of any dependent claim may be combined with the features of any of the independent claims or other dependent claims.

What is claimed is:

1. A method comprising:
receiving, by a processor, data modeling a first object as 2D slices and a second object as a 3D mesh;
determining, by the processor, intended fabrication chamber content to be generated in a common additive manufacturing operation, by deriving:
as a first data set of the intended fabrication chamber content, a first virtual fabrication chamber indicative of the first object modeled as the 2D slices, and
as a second data set of the intended fabrication chamber content, a second virtual fabrication chamber indicative of the second object modeled as the 3D mesh;
identifying, by the processor, the first data set within the intended fabrication chamber content;
applying, by the processor, a geometrical transformation to the first data set identified within the intended fabrication chamber content;
determining, by the processor, object generation instructions based on the intended fabrication chamber content within which the geometrical transformation has been applied to the first data set; and
causing, by the processor, an additive manufacturing apparatus to additively manufacture the first and second objects using the object generation instructions.

2. The method according to claim 1, further comprising determining, by the processor, an intended layer content within the intended fabrication chamber content,
wherein identifying the first data set within the intended fabrication chamber content comprises masking the second data set within the intended layer content, and
wherein applying the geometrical transformation to the first data set identified within the intended fabrication chamber content comprises applying the geometrical transformation to unmasked data within the intended layer content.

3. The method according to claim 1, wherein the geometrical transformation comprises an offset applied to surfaces defined based on the second data set within the intended fabrication chamber content.

4. The method according to claim 1, wherein the intended fabrication content corresponds to a layer to be generated in the additive manufacturing operation.

5. The method according to claim 1, wherein the first object is one of a plurality of first objects that are modeled as 2D slices, and wherein the geometrical transformation is determined for each first object individually.

6. The method according to claim 1, further comprising voxelizing, by the processor, at least the second object within the second data set prior to identifying the first data set within the intended fabrication chamber content.

7. The method according to claim 6, wherein the first object is already voxelized when the data modeling the first object is received.

8. The method according to claim 6, further comprising voxelizing, by the processor, the first object modeled within the received data prior to identifying the first data set within the identified fabrication chamber content.

9. The method according to claim 6, further comprising applying, by the processor, a geometrical transformation to the second object within the second data set prior to voxelizing at least the second object within the second data set.

10. A non-transitory computer-readable data storage medium storing program code executable by a processor to perform processing comprising:
receiving data modeling a first object as 2D slices and a second object as a 3D mesh;
determining intended fabrication chamber content to be generated in a common additive manufacturing operation, by deriving:

as a first data set of the intended fabrication chamber content, a first virtual fabrication chamber indicative of the first object modeled as the 2D slices, and as a second data set of the intended fabrication chamber content, a second virtual fabrication chamber indicative of the second object modeled as the 3D mesh;

identifying the first data set within the intended fabrication chamber content;

applying a geometrical transformation to the first data set identified within the intended fabrication chamber content; determining, by the processor, object generation instructions based on the intended fabrication chamber content within which the geometrical transformation has been applied to the first data set; and sending the object generation instructions to an additive manufacturing apparatus to additively manufacture the first and second objects.

11. The non-transitory computer-readable data storage medium according to claim 10, wherein the processing further comprises voxelizing at least the second object within the second data set prior to identifying the first data set within the intended fabrication chamber content.

12. The non-transitory computer-readable data storage medium according to claim 11, wherein either the first object is already voxelized when the data modeling the first object is received, or the processing further comprises voxelizing the first object modeled within the received data prior to identifying the first data set within the identified fabrication chamber content.

13. The non-transitory computer-readable data storage medium according to claim 11, wherein the processing further comprises applying a geometrical transformation to the second object within the second data set prior to voxelizing at least the second object within the second data set.

14. The non-transitory computer-readable data storage medium according to claim 10, wherein the processing further comprises determining an intended layer content within the intended fabrication chamber content, wherein identifying the first data set within the intended fabrication chamber content comprises masking the second data set within the intended layer content, and wherein applying the geometrical transformation to the first data set identified within the intended fabrication chamber content comprises applying the geometrical transformation to unmasked data within the intended layer content.

15. A system comprising:

a processor; and a memory storing instructions executable by the processor to:

receive data modeling a first object as 2D slices and a second object as a 3D mesh;

determine intended fabrication chamber content to be generated in a common additive manufacturing operation, by deriving:

as a first data set of the intended fabrication chamber content, a first virtual fabrication chamber indicative of the first object modeled as the 2D slices, and as a second data set of the intended fabrication chamber content, a second virtual fabrication chamber indicative of the second object modeled as the 3D mesh;

identifying the first data set within the intended fabrication chamber content;

apply a geometrical transformation to the first data set identified within the intended fabrication chamber content; determining, by the processor, object generation instructions based on the intended fabrication chamber content within which the geometrical transformation has been applied to the first data set; and cause additive manufacture of the first and second objects using the object generation instructions.

16. The system according to claim 15, wherein the instructions are executable by the processor to further at least the second object within the second data set prior to identifying the first data set within the intended fabrication chamber content.

17. The system according to claim 16, wherein either the first object is already voxelized when the data modeling the first object is received, or the instructions are executable by the processor to further voxelize the first object modeled within the received data prior to identifying the first data set within the identified fabrication chamber content.

18. The system according to claim 16, wherein the instructions are executable by the processor to further apply a geometrical transformation to the second object within the second data set prior to voxelizing at least the second object within the second data set.

19. The system according to claim 15, wherein the instructions are executable by the processor to further determine an intended layer content within the intended fabrication chamber content, wherein identifying the first data set within the intended fabrication chamber content comprises masking the second data set within the intended layer content, and wherein applying the geometrical transformation to the first data set identified within the intended fabrication chamber content comprises applying the geometrical transformation to unmasked data within the intended layer content.

20. The system according to claim 15, wherein the processor and the memory are part of an additive manufacturing apparatus that additively manufactures the first and second objects using the object generation instructions.

* * * * *